(12) United States Patent
Koptisch

(10) Patent No.: US 7,295,899 B2
(45) Date of Patent: Nov. 13, 2007

(54) METHOD AND CONTROLLER FOR SETTING A CONTROL ELEMENT AND A USE OF SAID CONTROLLER

(75) Inventor: Gerhard Koptisch, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 386 days.

(21) Appl. No.: 10/977,681

(22) Filed: Oct. 28, 2004

(65) Prior Publication Data

US 2005/0118012 A1 Jun. 2, 2005

(30) Foreign Application Priority Data

Oct. 29, 2003 (EP) ................... 03024964

(51) Int. Cl.
 *G05B 19/416* (2006.01)
 *F01D 17/14* (2006.01)
(52) U.S. Cl. .................. 700/287; 700/289; 415/13
(58) Field of Classification Search ................ 700/282, 700/289, 290, 287; 415/13; 137/624.11; 60/646, 660
See application file for complete search history.

(56) References Cited

U.S. PATENT DOCUMENTS

| 3,709,626 | A | * | 1/1973 | Eggenberger ............... 700/289 |
| 4,056,331 | A | * | 11/1977 | Sato .......................... 700/289 |
| 4,474,012 | A | * | 10/1984 | Chamberlain ................ 60/646 |
| 5,848,609 | A | * | 12/1998 | Marchesseault et al. ..................... 137/624.11 |
| 5,950,668 | A | | 9/1999 | Baumann |
| 5,998,954 | A | | 12/1999 | Scholten |

FOREIGN PATENT DOCUMENTS

| EP | 0 844 544 A2 | 5/1998 |
| EP | 1 191 190 A1 | 3/2002 |

* cited by examiner

*Primary Examiner*—Zoila Cabrera
*Assistant Examiner*—Steven R. Garland

(57) ABSTRACT

For setting the position of a control element, a controller and method according to the invention provide for impressing a required temporal characteristic of the actuating signal onto a should-be value then using said should-be value as a time-variable signal for forming the actuating signal.

5 Claims, 1 Drawing Sheet

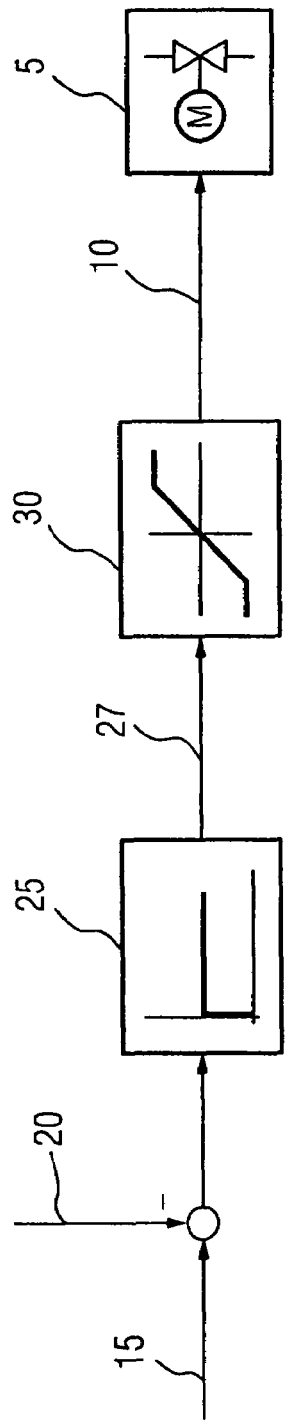
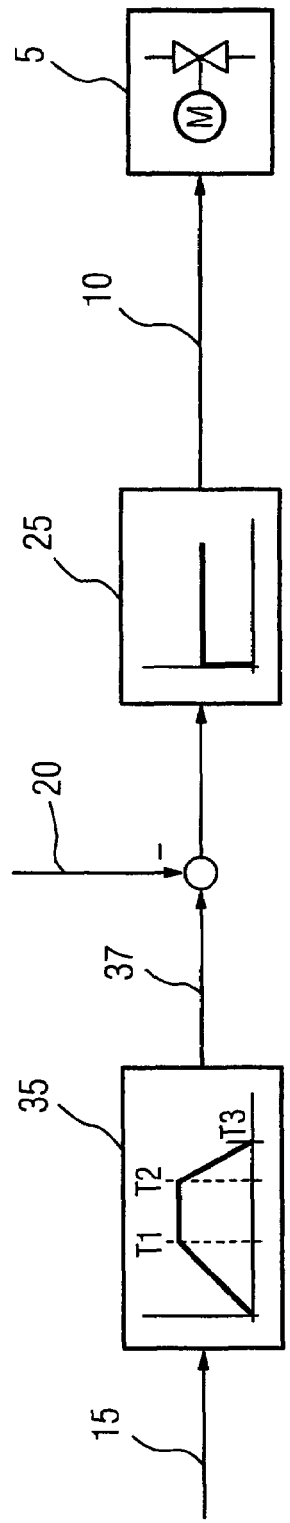
FIG 1 (PRIOR ART)
FIG 2

METHOD AND CONTROLLER FOR SETTING A CONTROL ELEMENT AND A USE OF SAID CONTROLLER

CROSS REFERENCE TO RELATED APPLICATION

This application claims priority of the European application No. 03024964.3 EP filed Oct. 29, 2003, which is incorporated by reference herein in its entirety.

FIELD OF THE INVENTION

The invention relates to a method and a controller for setting a control element. It further relates to a use of said controller.

BACKGROUND OF THE INVENTION

In many technical systems controllers are used to bring the process metrics of all kinds of industrial processes to specific, required values and to maintain said values as accurately as possible. Only then can reliable and economical operation of the respective technical system be ensured.

Alongside cited maintaining of the process metrics at required values, the dynamics of the control mechanisms employed often also play a major role: On the one hand the controllers must intervene promptly; on the other hand the actuating signals they produce must exhibit required temporal characteristics. It is in particular usually necessary to avoid too great an overshoot and too fast an actuation. The latter problem is addressed by, for example, applying the actuating signal to the control element in a ramped manner; the actuating signal is for this purpose routed to what is termed a ramp generator, which can additionally perform control-output limiting. The ramp generator generates a further actuating signal (which, where applicable, is restricted in its amplitude in accordance with the above-cited required control-output limiting) which rises linearly up to the end value of the applied actuating signal and which is routed to the control element.

For example, in the case of a steam power plant the flow of steam mass to the steam turbine must be controlled according to specified, required characteristics in keeping with the specifications of the manufacturer of the steam turbine. It is usually necessary here to maintain an actuating speed at which the steam valve must be opened in response to a control output or, proceeding therefrom, must be closed. This means, for instance, that the steam turbine must not be subjected to a sudden impact of a large quantity of steam.

The steam valve can be embodied in the form of, for instance, a valve which is actuated via a drive driven in turn via a servo valve. Control current is here used as the actuating signal for the servo valve. This current signal is generated in known control mechanisms by further processing the output signal (customarily having a determined fixed value for achieving a required flow of steam mass to the steam turbine) of the valve positioner in the steam turbine controller into the actuating signal for the steam valve by means of a previously cited ramp generator. The rate of rise of the actuating signal generated by the ramp generator of the steam turbine controller and said signal's possibly required control-output limiting have hitherto not be specified until the power-on phase of the steam turbine controller in the steam power plant. Alongside a servo drive for opening and closing, the steam valve has a position sensor which reports the present position in terms of its degree of opening to the steam turbine controller in the form of a current signal.

For setting a required opening or, as the case may be, closing speed of the steam valve, said valve is usually opened and closed several times for test proposes when the steam turbine controller is being powered on in order to assign the current signals then generated by the position sensor of the steam valve to the respectively current degree of opening of the steam valve. For example, the steam valve is taken from the fully closed to the fully opened position within a period of 1-5 sec. and the current signals generated during this process by its position sensor are registered. As an example, for the fully closed position a current of 4 mA could be produced which thereafter rises for example essentially, or otherwise according to other temporal characteristics, linearly up to an end value of, say, 18 mA corresponding to the fully opened position.

The current characteristic obtained during power-on is then implemented in the steam turbine controller's ramp generator so that, in the event of operation, the steam turbine valve can be opened and/or closed within a required period of time, meaning, therefore, that a valve-actuating speed required by the steam turbine manufacturer is maintained.

A disadvantage of this known method is that the steam turbine controller takes a long time to power on as the actuating signal for the steam valve first has to be matched locally in the power plant to the required temporal characteristics, for example to a defined valve-actuating speed, and a test phase must, in particular, be provided for this.

SUMMARY OF THE INVENTION

The object of the invention is therefore to describe a controller and a method for setting the position of a control element by means of both of which it is made easier to power on a corresponding controlling device.

In terms of the controller the object is achieved according to the invention by a controller for setting the position of a control element by means of an actuating signal, with its being possible to route a should-be value and an as-is value of a quantity being set of the control element to a position controller, and with its further being possible to impress a required temporal characteristic with reference to the actuating signal onto the should-be value and to route said should-be value to the position controller as a time-variable signal.

Compared to known controllers where the actuating signal is only matched to a required temporal characteristic, for example a valve-actuating speed, in the technical system by means of an above-cited known method when the controlling device is powered on, the controller according to the invention provides for implementing the actuating signal's required temporal characteristic by transferring said required temporal characteristic to the should-be value then routing said should-be value to the controller as a corresponding time-variable signal.

The actuating signal's required dynamic characteristic is therefore already set in the laboratory or test bay when the controller is being implemented through said characteristic's being impressed onto the should-be value when the latter is routed to the controller.

The actuating signal will thus already have the required temporal characteristic when the controller according to the invention is powered on in the technical system.

It is accordingly possible to implement a required, prescribed temporal characteristic of the actuating signal when the controller is being planned and not to have to wait until power-on to perform this work step. With the controller according to the invention, control-valve limiting, which in the case of known controllers and methods does not take place until the manipulated variable is limited, can likewise be taken into account when the time-variable should-be value is formed.

What is achieved in this manner is dynamic control-valve limiting essentially provided by a ramp generator having settable rise times or, as the case may be, fall times for opening and closing the control element. Said times can be defined by, for example, time parameters identifying, for instance, the period of time within which the control element has to be opened and/or closed. Said parameters can differ with respect to each other; it is therefore possible to specify different speeds at which the control element has to be opened or, as the case may be, closed.

There being a large number of such control elements in a technical system, for example a steam power plant, the required overall power-on time is considerably reduced through the use of a controller according to the invention owing to dispensing with dynamic matching of the corresponding actuating signals for each individual control for each individual valve.

The control element is preferably a valve for feeding steam to a steam turbine.

The use of a controller according to the invention offers advantages particularly in steam power plants during power-on, as an actuation speed, which must be implemented, is virtually always prescribed there for the steam valve and said speed can now be taken into account at the planning stage without having to wait until controlling is powered on.

In a further preferred embodiment the controller is a P-controller.

A proportional controller of this type not being subject to any time constants, the time-variable should-be value will be processed by it with no distortions or delays. The actuating signal will consequently display the required temporal characteristic with the highest degree of accuracy.

In terms of the method the object is achieved according to the invention by a method for setting the position of a control element by means of an actuating signal, with an actuation speed being specified for the control element by means of a required temporal characteristic of the actuating signal, with the temporal characteristic of the actuating signal being impressed onto a should-be value, and the should-be value being formed as a time-variable signal for forming the actuating signal.

The time-variable should-be value is here preferably routed to a position controller, with the actuating signal being formed by means of said position controller.

In a particularly preferred embodiment the actuation speed is the speed at which a valve is actuated as the control element.

The invention leads furthermore to a use of a controller according to the invention in a power plant for setting a steam valve.

BRIEF DESCRIPTION OF THE DRAWINGS

An exemplary embodiment is explained in more detail below.

FIG. 1 shows a controller according to the prior art, and
FIG. 2 shows a controller according to the invention.

DETAILED DESCRIPTION OF THE INVENTION

FIG. 1 shows a controller according to the prior art by means of which a control element 5 is actuated, with said control element being embodied as a valve whose electro-hydraulic drive is driven via a servo valve.

The difference between a should-be value 15 and an as-is value 20 is here routed to a position controller 25 and processed into a position controller output signal 27. The position controller 25 is here embodied as a proportional controller. The should-be value 15 is preferably embodied as a signal having at least at times a constant value.

The position controller output signal 27 therefore likewise has a constant value corresponding to a required position of the control element 5, for example a required degree of opening.

Its generally being the case that a technical system component being controlled must not be subjected to an abrupt change in an actuating signal 10, the position controller output signal 27 is first routed to a dynamic limiting means 30 by means of which required temporal rising or, as the case may be, required temporal falling, as well as amplitude limiting, is effected.

The dynamic limiting means 30 is preferably implemented by means of a ramp generator which, where applicable, additionally has an amplitude limiting means so that the actuating signal 10 does not have the value of the position controller output signal 27 until a specific, defined time has elapsed, with the last-cited value being restricted to a maximum amount by the possibly present amplitude limiting means.

A required temporal characteristic of the actuating signal 10 can be implemented through the dynamic limiting means 30 in the case of the controller shown embodying the prior art, so that the actuating signal 10 has a required temporal characteristic, in particular a required actuating speed.

In known controllers the dynamic limiting means 30 is not configured until the controller is powered on.

FIG. 2 shows a controller 1 according to the invention.

Here, a should-be value 15 is routed to a signal matching stage 35 by means of which a required temporal characteristic of the actuating signal is impressed onto the should-be value 15.

The signal matching stage 35 consequently supplies a matched output signal 37 as a time-variable should-be value which is routed to a position controller 25 as a control difference reduced by an as-is value 20. Said position controller 25 generates a time-variable signal as an actuating signal 10 which is routed to a control element 5 preferably embodied as a valve driven by means of a servo motor.

The required temporal characteristic can be specified and impressed onto the should-be value 15 by means of parameters T1, T2, T3 of the signal matching stage 35. For this purpose the signal matching stage 35 in particular includes a ramp generator having settable rise or, as the case may be, fall times and, where applicable, an amplitude limiting means.

The temporal characteristic which the actuating signal 10 is to have already being known at the planning phase in the case of most control functions, said temporal characteristic can already be implemented in the laboratory or test bay at the planning phase by means of a controller 1 according to the invention by configuring the signal matching stage 35 through suitably defining the parameters T1, T2, T3. The parameter T1 can specify, for example, the period of time within which the control element 5 is to be brought from the fully closed to the fully opened position.

The parameters T2 and/or T3 can specify the period of time within which the control element 5 is to be brought from its fully opened to a fully closed position.

The invention claimed is:

1. A controller configured to set a position of a control element in a power plant, the controller comprising:
   a signal matching stage coupled to receive a signal indicative of a should-be value, the signal matching stage configured to apply to the signal received by the signal matching stage a predetermined temporal characteristic required by an actuating signal to be applied to the control element, the signal matching stage further configured to supply an output signal containing the predetermined temporal characteristic;
   a summer having a non-inverting input terminal coupled to receive the output signal from the signal matching stage containing the predetermined temporal characteristic, the summer further having an inverting input terminal coupled to receive a signal indicative of an as-is value, the summer configured to supply an output signal constituting a difference between the signals received by the summer, the difference signal from the summer containing the predetermined temporal characteristic; and
   a position controller coupled to receive the output signal from the summer, the controller configured to generate the actuating signal for the control element, wherein the actuating signal contains the predetermined temporal characteristic without said position controller having to determine said temporal characteristic for the actuating signal, said temporal characteristic having been applied upstream the position controller at the signal matching stage.

2. The controller according to claim 1, wherein the control element is a valve that feeds steam to a steam turbine.

3. The controller according to claim 1, wherein the position controller is a proportional type of controller.

4. The controller according to claim 1, wherein the controller is used to set a steam valve in the power plant.

5. The controller according to claim 1, wherein the signal matching stage is responsive to at least one settable parameter for specifying the predetermined temporal characteristic.

* * * * *